(12) United States Patent
McCormick

(10) Patent No.: US 7,410,684 B2
(45) Date of Patent: Aug. 12, 2008

(54) INSULATING LINER FOR AN ARTICLE OF CLOTHING

(75) Inventor: Bruce McCormick, Houston, TX (US)

(73) Assignee: PolarWrap, LLC, Memphis, TN (US)

( * ) Notice: Subject to any disclaimer, the term of this patent is extended or adjusted under 35 U.S.C. 154(b) by 65 days.

(21) Appl. No.: 11/156,890

(22) Filed: Jun. 20, 2005

(65) Prior Publication Data

US 2005/0281988 A1 Dec. 22, 2005

Related U.S. Application Data

(60) Provisional application No. 60/580,933, filed on Jun. 19, 2004.

(51) Int. Cl.
*B32B 3/00* (2006.01)
*A43B 23/07* (2006.01)

(52) U.S. Cl. .................. 428/190; 36/44; 36/55; 2/69; 2/159

(58) Field of Classification Search ............... 428/190; 36/44, 55; 2/69, 159
See application file for complete search history.

(56) References Cited

U.S. PATENT DOCUMENTS

| | | | |
|---|---|---|---|
| 4,590,689 A | 5/1986 | Rosenberg | |
| 4,658,515 A | 4/1987 | Oatman | |
| 4,726,870 A | 2/1988 | McWilliams et al. | |
| 5,369,257 A | 11/1994 | Gibbon | |
| 5,669,161 A * | 9/1997 | Huang | 36/43 |
| 5,722,482 A | 3/1998 | Buckley | |
| 6,004,662 A | 12/1999 | Buckley | |
| 6,125,645 A | 10/2000 | Horn | |
| 6,183,855 B1 | 2/2001 | Buckley | |
| 6,319,599 B1 | 11/2001 | Buckley | |
| 6,464,672 B1 | 10/2002 | Buckley | |
| 6,493,881 B1 | 12/2002 | Picotte | |
| 6,613,953 B1 | 9/2003 | Altura | |
| 6,855,410 B2 | 2/2005 | Buckley | |
| 6,859,364 B2 | 2/2005 | Yuasa et al. | |
| 2001/0005946 A1 | 7/2001 | Brown | |
| 2002/0094426 A1 | 7/2002 | Stepanian et al. | |
| 2002/0164474 A1 | 11/2002 | Buckley | |
| 2002/0193498 A1 | 12/2002 | Brown | |
| 2004/0018336 A1 | 1/2004 | Farnworth | |
| 2004/0107482 A1 | 6/2004 | Picotte | |

(Continued)

FOREIGN PATENT DOCUMENTS

WO WO03097227 A1 * 11/2003

OTHER PUBLICATIONS

A Breakthrough in Advanced Materials, Aspen Aerogels, Inc. (2 pgs) www.aerogels.com, 2003.

*Primary Examiner*—Ted Kavanaugh
(74) *Attorney, Agent, or Firm*—Reising, Ethington, Barnes, Kisselle, P.C.

(57) ABSTRACT

An insulating liner for an article of clothing includes a first layer, a second layer attached to the first layer, and an insulating layer sealed between the first and second layers, wherein the insulating layer is composed of an aerogel material. The first and second layers can be a PVC foam hermetically sealed about the aerogel material by welding. In a preferred embodiment, the insulating liner is a shoe liner that includes a polyester wearing material adhered to the top layer of PVC foam. A method of forming the insulating liner is also provided.

21 Claims, 4 Drawing Sheets

U.S. PATENT DOCUMENTS

| | | |
|---|---|---|
| 2004/0142149 A1 | 7/2004 | Mollendorf et al. |
| 2004/0209061 A1 | 10/2004 | Farnworth |
| 2005/0100728 A1 | 5/2005 | Ristic-Lehmann et al. |
| 2005/0143515 A1 | 6/2005 | Ristic-Lehmann et al. |
| 2005/0175799 A1 | 8/2005 | Farnworth |
| 2006/0035054 A1 | 2/2006 | Stepanian et al. |

* cited by examiner

INSULATING LINER FOR AN ARTICLE OF CLOTHING

CROSS-REFERENCE TO RELATED APPLICATION

This application claims the priority of U.S. application Ser. No. 60/580,933, filed Jun. 19, 2004, the complete disclosure of which is hereby incorporated by reference.

TECHNICAL FIELD

This invention relates generally to clothing and garment articles and, more particularly, to insulating garments as well as insulating garment articles such as shoe liners or other clothing inserts that are used in conjunction with an article of clothing.

BACKGROUND OF THE INVENTION

Incorporation of insulating liners with the use of an article of clothing is known. As used herein, "clothing", "garment", or "article of clothing" includes not only under and outer wear (shirts, blouses, pants, shorts, skirts, underwear, etc.), but also such things as footwear, gloves, blankets, sleeping bags, and other articles used to provide protection or comfort against the elements. Such insulating liners when used in combination with the overlaying article of clothing shields the user against uncomfortably cold or hot temperatures and high levels of moisture. Various insulating materials for insulating liners that have been used in the textile industry include felt, fleece, flannel, wool, various forms of latex foam, or the like. Although flexible and readily adaptable for textile applications, such materials are often provided in relatively thick slabs that can be bulky, thereby requiring the user, for example, to use a larger sized garment in order to fit the insulating insert or liner. Also, such materials often do not exhibit effective insulative properties in extremely high or extremely low temperature-related environments.

Silica aerogels have been known to exhibit excellent thermal insulation performance and have been readily adapted for use in high temperature thermal insulation and cryogenic thermal insulation applications including, for example, advanced space suit designs by NASA. Aerogels, as that term is used herein, include polymers with pores with less than 50 nanometers in porous diameter. In a process known as sol-gel polymerization, monomers are suspended in solution and react with one another to form a sol, or collection, of colloidal clusters. The larger molecules then become bonded and cross-linked, forming a nearly solid and transparent sol-gel. An aerogel of this type can be produced by carefully drying the sol-gel so that the fragile network does not collapse.

Thermal insulation blankets using aerogels have been developed, and aerogel materials are now commercially available in which the aerogel is impregnated or otherwise incorporated into a carbon-based media. One difficulty with using silica aerogels is that the aerogel tends to be dusty, even when supported by a carrier material. If the aerogel material is not properly contained and sealed within the liner assembly, the dust particles may escape the liner and into the atmosphere thereby diminishing the effective insulative life of the insulating liner.

Thus, it is an object of the present invention to provide an insulating lining for an article of clothing that effectively insulates against hot and cold temperature conditions as well as against moisture, while reducing or even eliminating the loss of the aerogel dust.

SUMMARY OF THE INVENTION

In accordance with one aspect of the present invention, an insulating liner for an article of clothing includes a first layer, a second layer, and an insulating layer sealed between the first and second layers, wherein the insulating layer comprises an aerogel material.

In accordance with another aspect of the present invention, a shoe liner includes a first PVC foam layer, a second PVC foam layer, a wearing material attached to an outer surface of the second layer, and an aerogel material hermetically sealed between the first and second layers, wherein the aerogel material comprises an aerogel carried by a fibrous substrate.

In accordance with a further aspect of the present invention, a method of forming insulating liners for articles of clothing includes the steps of: providing first and second sheets of an impermeable polymeric material; encapsulating at least one insulation layer between the first and second sheets; and cutting the sealed first and second sheets to a desired shape.

In accordance with an additional aspect of the present invention, a boot having an integrated insulating liner includes a sole, a first layer attached to the sole, a second layer disposed within the first layer, and an insulating layer sealed between the first and second layers, wherein the insulating layer comprises an aerogel material.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

Figure 1:
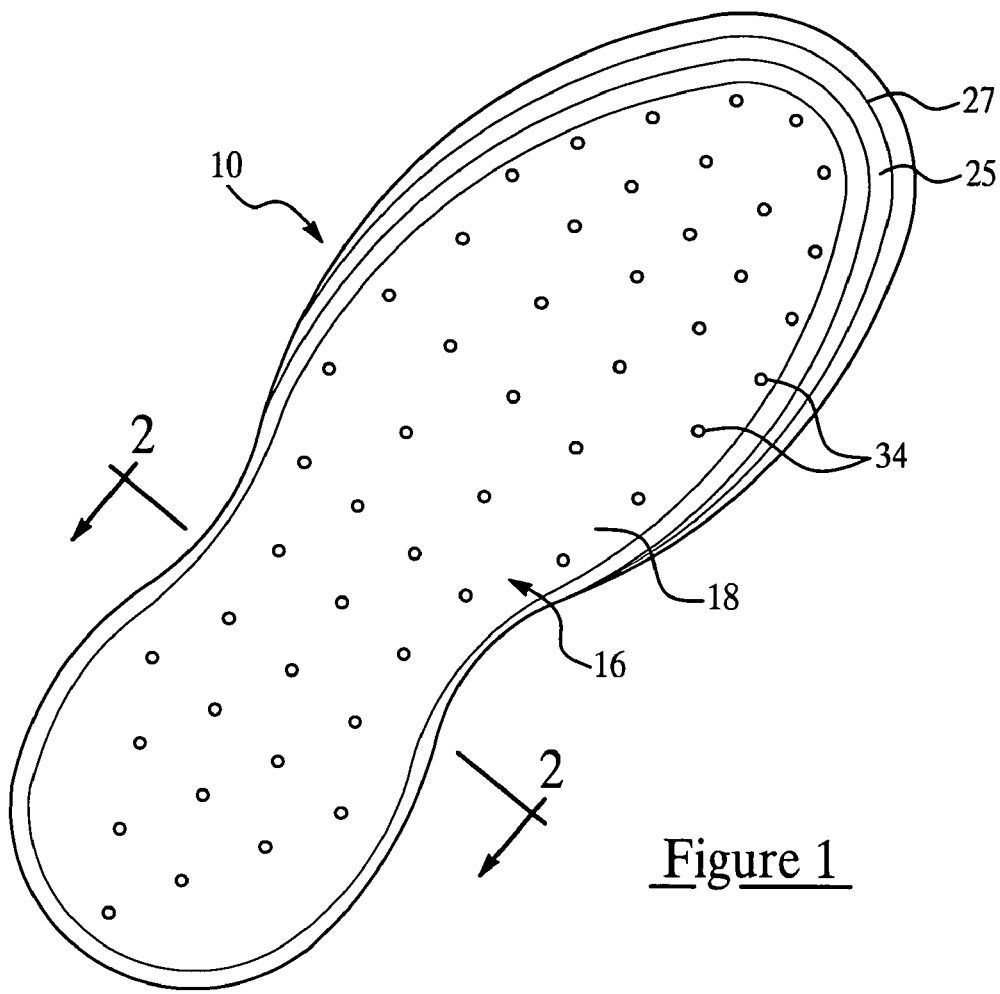
FIG. 1 is a top view of an insulating liner for a shoe.
Figure 2:
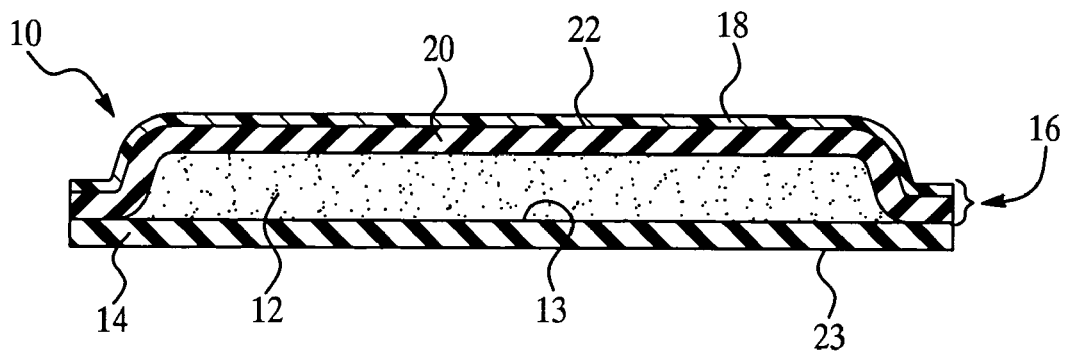
FIG. 2 is a cross-sectional view taken along line 2-2 of the insulating liner shown in FIG. 1.

With reference to the drawings, FIGS. 1 and 2 depict a multiple layer insulating shoe liner 10 comprising an aerogel-containing insulation layer 12 encapsulated within two support layers 14, 16 by a hermetic seal. The insulation layer 12 is a relatively thin layer of material that is composed of a dust generating aerogel composite including a nonporous silica matrix supported or carried by a polymeric, fibrous substrate. The insulation layer 12 is die-cut and then disposed on an upper surface 13 of the first support layer 14. The liner 10 is completed by disposing the second support layer 16, having a wearing material 18 laminated on an upper surface 22 of a polymeric material layer 20, over the insulation layer 12. The periphery of the first and second support layers 14, 16 are hermetically sealed by a high frequency or ultrasonic welder for encapsulating the insulation layer 12 between the support layers 14, 16. The insulating shoe liner 10 can include a frontal region 25 which comprises the upper and lower layers 14, 16 bonded together without any insulating material 12 therebetween. This frontal region includes raised contour ridges 27 that comprise cut lines along which the liner 10 can be trimmed to fit various sized shoes.

The insulation layer 12 is composed of a carrier material impregnated with an aerogel composite. Studies have shown that aerogel composites demonstrate superior insulative properties as opposed to other insulators conventionally used in textile, garment and footwear applications. Based upon their chemical structures, aerogels can have low bulk densities of about 0.15 g/cm$^3$ or less, and more preferably of about 0.03 to 0.3 g/cm$^3$, very high surface areas of generally from about 400 to 1,000 m$^2$/g and higher, and more preferably of about 700 to 1000 m$^2$/g, high porosity of about 95% and greater, and more preferably greater than about 97% porosity, and relatively large pore volume with more than about 3.8 mL/g, and more preferably with about 3.9 mL/g and higher. The combination of these properties in an amorphous structure provides low thermal conductivity values of about 9 to 16 mW/m-K at 37° C. and 1 atmosphere of pressure for any coherent solid material.

The carrier used in insulation layer 12 is a polymeric fibrous material that effectively carries the aerogel composite material with it. The carrier itself can be a carbon-based material, such as a carbon felt or other fibrous material, or can be formed from polyester or any other material suitable for supporting and retaining the aerogel within the carrier. The fibrous material may include a single type of polymer fiber or may include a combination or matrix of fibers and is somewhat bulky, as compared to the aerogel, and includes some resilience preferably with some bulk recovery. The use of the carrier minimizes the volume of unsupported aerogel while avoiding degradation of the thermal performance thereof. Also, the carrier permits the aerogel to be available in the form of a sheet or a roll that contains one continuous sheet or strip that may be easily cut to any desirable size and/or shape using conventional textile cutting tools such as die cutting machines, for example. The carrier further provides the aerogel material in a very flexible state that is very manageable for textile, footwear and other similar applications. Suitable aerogel materials for use in the present invention include the Spaceloft® AR3101, AR3102 and AR3103 materials as well as Pyrogel® AR5401, all of which are manufactured by Aspen Aerogels, Inc. of Marlborough, Mass.

The first support layer 14 is generally composed of an organic polymeric material, such as nylon, polystyrene, polypropylene, polyvinyl chloride (PVC), or the like. Specifically, the PVC material is structurally intact, yet flexible, can be easily cut to a desired size and shape and further provides a somewhat sticky or gripping-like surface that is particularly advantageous for footwear applications. The lower surface 23 of the first support layer 14 readily grips and temporarily adheres to the insole of the shoe. For other textile-like applications, other materials such as nylon, for example, provides a similar structurally integral material suitable for the support layer 14 but does not exhibit such a gripping property, thereby making the liner 10 more adaptable for clothing inner linings and for outer linings where a non-grip surface is desired. In footwear applications, the support layer 14 for the liner 10 is preferably composed of PVC foam having a thickness in the range of about 1.5 mm to 2.5 mm, and more preferably of about 2.0 mm in thickness.

The second support layer 16 comprises the wearing material 18, about 1.0 mm or less in thickness, secured on the upper surface 22 of the polymeric material layer 20 by lamination, for example. The wearing material 18 is preferably made of a knitted or woven polyester material that can be easily cut to the desired size and/or shape of the liner 10, is readily adherable to the polymeric material 20, and further provides a comfortable wearing surface for the user. The polymeric material 20 is preferably the same PVC foam material that is used for the first structural layer 14 depending, of course, on the application (e.g., footwear application) in which the liner will be used.

In the illustrated embodiment, both the first and second support layers 14, 16 are structural layers that not only seal the aerogel material into an enclosed space, but also provide structural features such as cushioning to the shoe insert. Where such structural features are not needed, the layers 14, 16 can instead be implemented in other ways that will be apparent to those skilled in the art.

Figure 3:
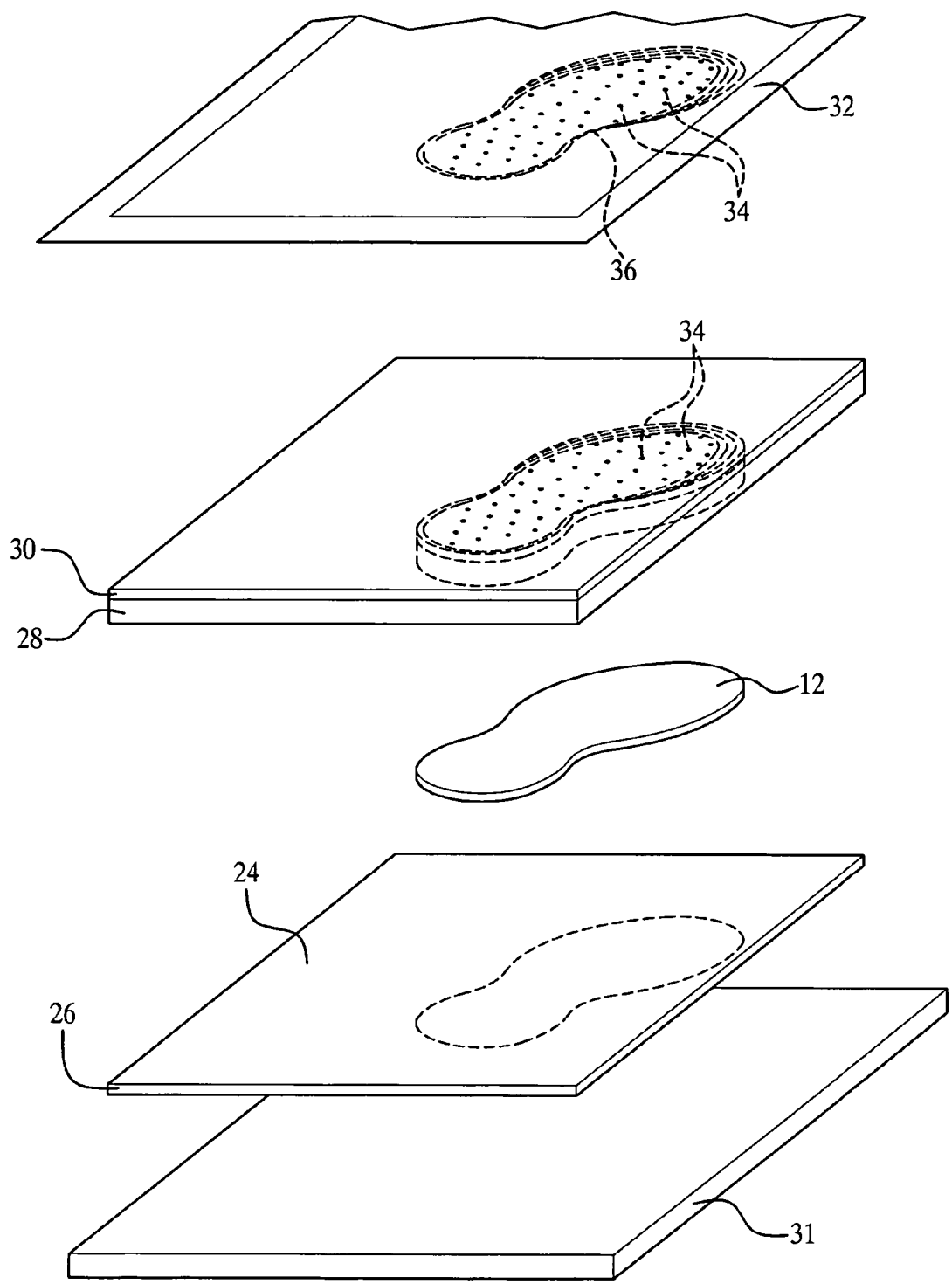
FIG. 3 is an exploded, perspective view of the formation of the insulating liner using the formation process of the present invention.

In reference now to FIGS. 1-3, the insulating liner 10 is formed by the following process. First, the insulation layer 12 is cut into a suitable size and shape and laid over an upper surface 24 of a PVC sheet 26. The PVC sheet 26, after the forming process of the liner 10 provides the first structural layer 14. Since the PVC sheet 26 may be provided in various sizes, more than one insulation layer 12 may be provided on the upper surface 24 to thereby form multiple liner assemblies 10 during a single insulation liner manufacturing process.

Second, a PVC sheet 28 is pre-preprocessed by laminating a sheet 30 of the knitted or woven polyester material 18 thereon. The combined PVC/polyester panel is then disposed over the insulating layer 12, thereby forming the second structural layer 16 of the insulating liner 10.

Third, a high frequency (HF) or ultrasonic welder (not shown) is provided including a lower platen 31 and upper die plate 32 having the contours of the shoe liner 10, including the shape, size, and embossments such as dimples 34 (as shown in FIGS. 1 and 3), a logo or the like. The die plate 32 includes one, two, or more outer die-cutting surfaces 36 (only one die cutting surface 36 shown in FIG. 3) for forming one, two or more simultaneous insulating liner assemblies 10. The sheet 26 having the insulating layer 12 thereover as well as the sheet 28 with the laminated material 30 thereon are then positioned on the platen 31 below the die plate 32, and the die-cutting surface 36 is aligned with the insulating layer 12. The die plate 32 then engages the wearing material 30, and presses the two sheets 26, 28 with the insulating layer 12 disposed between them together against the platen 31 while applying a high frequency of about 10-30 KHz to weld the sheets 26, 28 together just outside the periphery of insulating layer 12 to thereby encapsulate the insulating layer 12 therebetween. The die plate 32 further die-cuts the sheets 26, 28 with suitable pressure exerted on the layers 14, 16 from the welder and further simultaneously embosses the wearing material 18. A hermetic seal is thus formed between the PVC sheets 26, 28 and the insulting liner 10 is cut and formed having the dimples 34 and contour ridges 27, as well as manufacturers' logos or other embossments formed thereon. PVC foam is just one example of a suitable material that is impermeable to air and capable of being hermetically sealed to another layer of the same material about its periphery. Other suitable materials will be known to those skilled in the art. The welder can be a high frequency plastic welding machine such as is available from Weldech Electric Industry Co., Ltd. of Taichung, Taiwan (www.weldech.com).

The dimples 34 can comprise areas where the PCV and insulating layers are compressed tightly together such that the dimples comprise indentations in the upper surface. Alternatively, the dimples can be raised areas formed from recesses in the die plate 32. In this latter arrangement, the dimples help provide air flow between the shoe liner and wearer's foot.

These dimples can be formed on the first layer 14 as well, thereby allowing airflow between the insert and insole of the shoe. This latter arrangement is also advantageous during manufacturing since the layers 12, 14, 16 can be tightly compressed by the die plate 32 to squeeze out excess air before hermetically sealing the layers 14, 16 during welding. This helps minimize the amount of air trapped in the shoe liner. Furthermore, this manufacturing approach facilitates use of thicker foam layers such as, for example, a 5 mm foam layer. During compression and welding, the foam can be significantly compressed leaving dimples that protrude by several millimeters.

Figure 4:
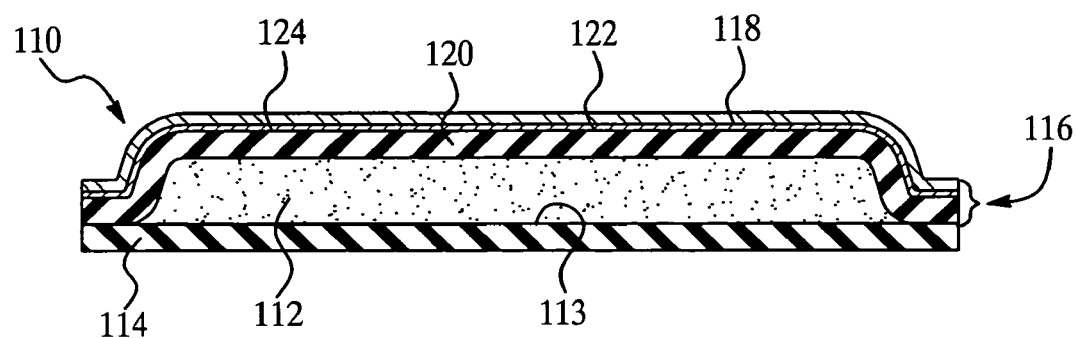
FIG. 4 is an alternative cross-sectional view taken along line 2-2 of the insulating liner shown in FIG. 1.

Turning now to FIG. 4, there is illustrated another embodiment of an insulating liner for an article of clothing in the form of a shoe liner 110. This embodiment is similar in many respects to the embodiment of FIG. 2 and like numerals that are offset by 100 between the embodiments generally designate like or corresponding elements throughout the several views of the drawing figures. Additionally, features of shoe liner 110 that are not explicitly described hereafter can be implemented in the same manner as described above for the first embodiment. The shoe liner 110 includes an aerogel-containing insulation layer 112 encapsulated within two support layers 114, 116 by a hermetic seal. As with the embodiment shown in FIG. 2, a wearing material 118 is disposed against an upper surface 122 of a polymeric material layer 120. Additionally, however, a thermally reflective layer 121 such as metal foil is disposed between the wearing material 118 and the polymeric material layer 120.

The manufacturing process for the liner 110 may be substantially similar to that described above, except that the thermally reflective layer 121 may be sandwiched between the wearing material 118 and the polymeric material layer 120 before the wearing material 118 is laminated or otherwise attached to the polymeric material layer 120. Alternatively, the wearing material 118 may be welded to the polymeric material layer 120 about the periphery of the insulation layer 112 with the thermally reflective layer 121 trapped therebetween. In any case, the thermally reflective layer 121 is provided between the insulating layer 112 and the wearer of the article of clothing. Accordingly, it is also contemplated that the thermally reflective layer 121 could be positioned between the polymeric material layer 120 and the insulation layer 112 if desired.

Figure 5:
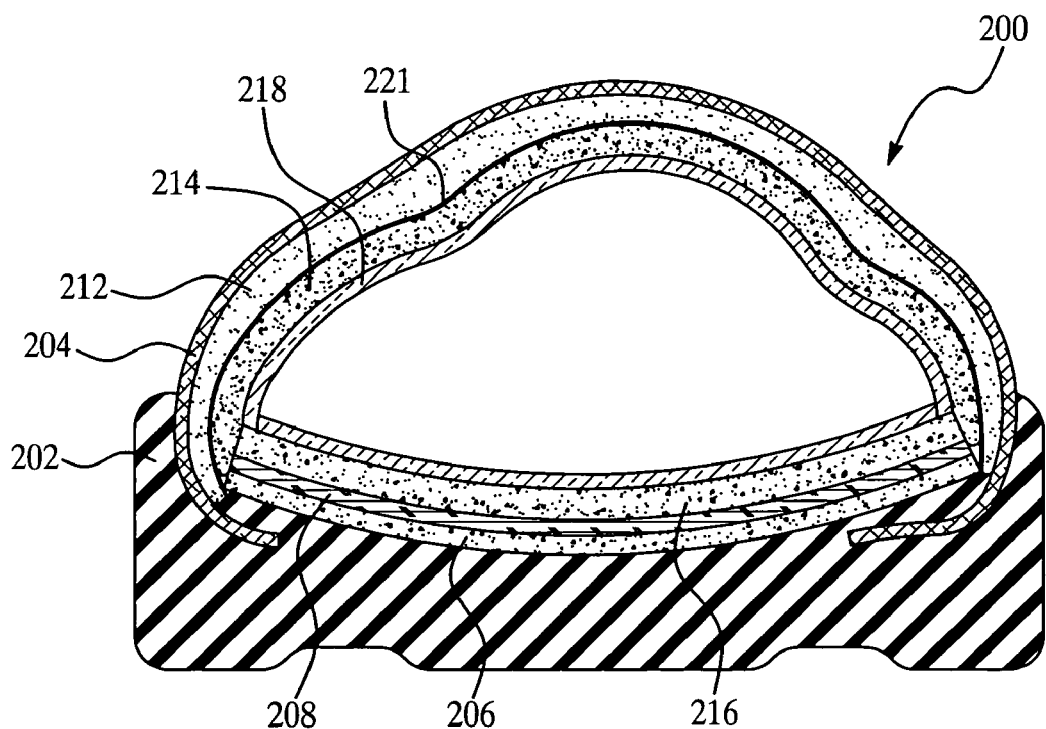
FIG. 5 is a cross-sectional view of a boot taken transversely through a toe end thereof.
Figure 6:
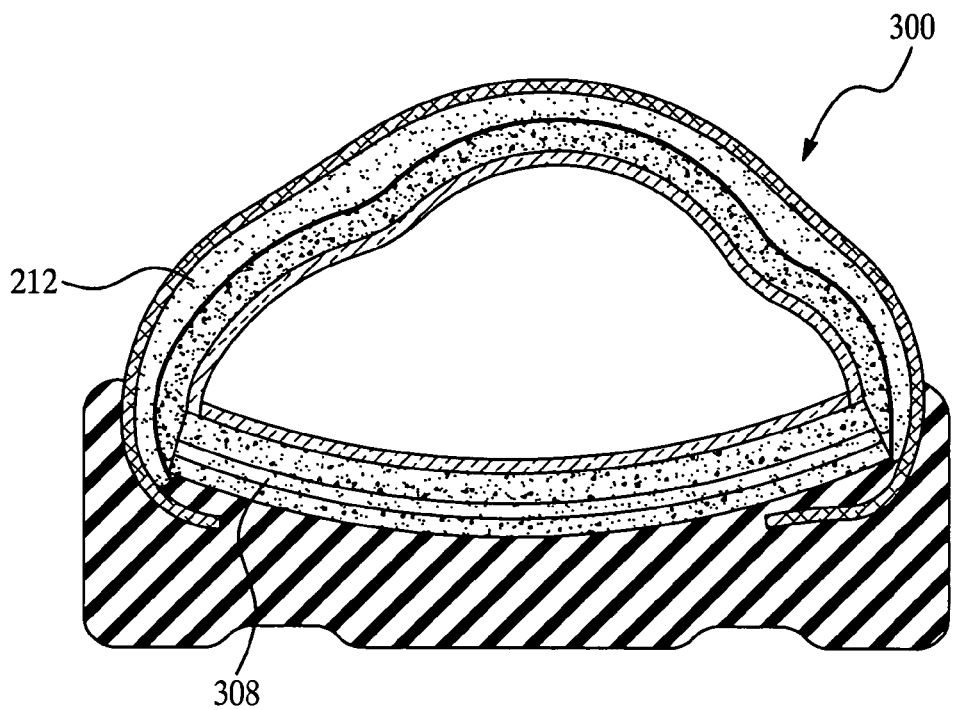
FIG. 6 is an alternative cross-sectional view of the boot of FIG. 5.
Figure 7:
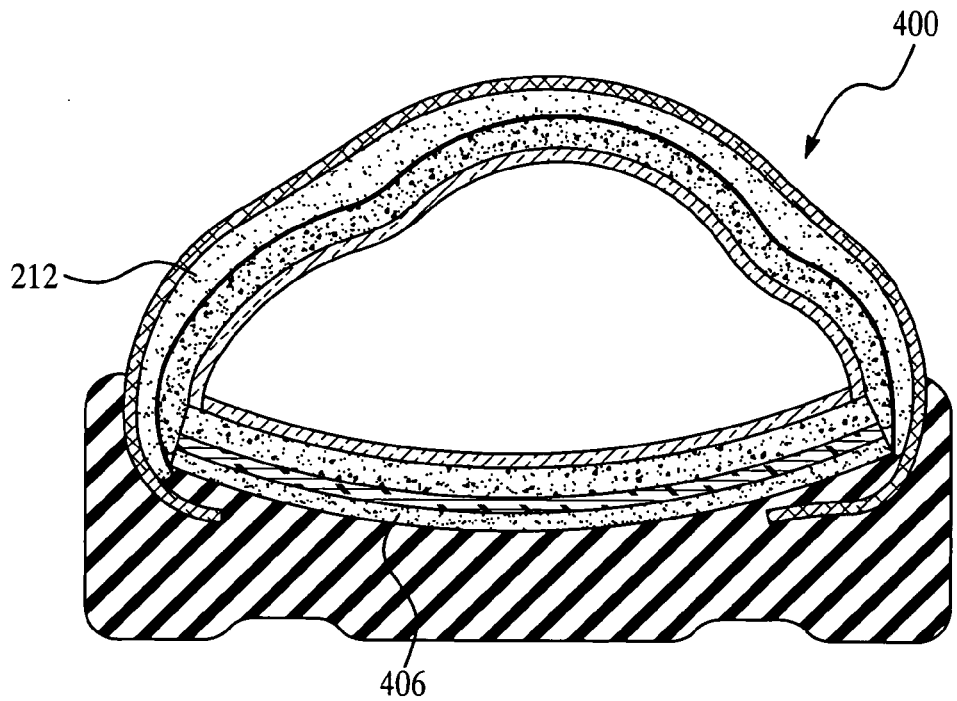
FIG. 7 is another alternative cross-sectional view of the boot of FIG. 5.

In general, FIGS. 5 through 7 illustrate embodiments of an article of clothing generally including an insulating liner integrated into a boot or shoe. As used herein, the terms boot and shoe are interchangeable footwear articles of clothing. Specifically, in FIG. 5 an insulating liner is integrated into a boot 200, wherein an aerogel material is contained and sealed within the boot upper to prevent aerogel dust particles from escaping the insulating liner. The boot 200 includes a molded sole 202 to provide a foundation for the boot 200 and an outer structural layer such as a leather upper 204 molded into the sole 202. Disposed on the sole 202 within the confines of the leather upper 204, the boot 200 further includes a foam layer or insert 206 that is preferably composed of PVC, and a cushion layer or insert 208 disposed on the foam insert 206 that is preferably composed of cork. The boot 200 further includes an aerogel upper or layer 212 disposed within the confines of the leather upper 204, between the leather upper 204 and another structural layer such as an open-cell foam upper 214 that is also disposed within the confines of the leather upper 204. The insulating liner or lining is thus defined by the aerogel layer 212 and open-cell foam upper 214, with the aerogel layer 212 being sealed between the leather upper 204 and foam layer 214. Aerogel layer 212 can be the same aerogel/carrier material as insulation layer 12 of the first embodiment. An open-cell foam insert 216 is disposed on top of the cushion layer 208 within the confines of the open-cell foam upper 214. A thermally reflective layer 221 may be disposed on either or both sides of the aerogel layer 212. Finally, a thin liner or wearing material 218 is preferably composed of polyester material and is applied to inside surfaces of the open cell foam upper 214 and insert 216.

In general, FIG. 6 illustrates an alternative embodiment of a boot including an insulating liner. Specifically, a boot 300 is composed of the same components and materials as described above, except that the cushion layer 208 of the boot 200 of FIG. 5 is replaced with an aerogel insert or layer 308. Accordingly, the boot 300 provides a substantially circumferential aerogel layer defined by the aerogel upper 212 and the aerogel insert 308, wherein the aerogel layer is contained and sealed within the boot to prevent aerogel dust particles from escaping the insulating liner.

FIG. 7 illustrates another embodiment of a boot including an insulating liner. Specifically, a boot 400 is composed of the same components and materials as described above, except that the foam insert 206 of the boot 200 of FIG. 5 is replaced with an aerogel insert or layer 406. Accordingly, the boot 400 provides a circumferential aerogel layer defined by the aerogel upper 212 and the aerogel insert 406, wherein the aerogel layer is again contained and sealed within the boot to prevent aerogel dust particles from escaping the insulating liner.

Also, with reference back to FIG. 5, both the insole layers 206 and 208 can comprise aerogel material. Alternatively, one or more aerogel layers could be added adjacent to one or both of the layers 206 and 208. In yet another embodiment, the upper aerogel layer 212 can be eliminated and instead the aerogel layer can be used in the insole only forming, in effect, an integrated shoe liner placed beneath at least the uppermost layer 218.

It is to be understood that the foregoing description is not a description of the invention itself, but of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above or where the statement specifically refers to "the invention." Various other embodiments and various changes and modifications to the disclosed embodiment(s) will become apparent to those skilled in the art. For example, the insulating liner 10 may further include a cushion layer disposed between the structural layers 14, 16 in addition to the insulating layer 12. Also, although the above description refers to both aerogels and aerogel composites, it will be appreciated by those skilled in the art that the aerogel composites comprise aerogels that have been formed with another substance, and that either aerogels per se or aerogel composites can be used without departing from the scope of the invention. All such other embodiments, changes, and modifications are intended to come within the scope of the appended claims.

As used in this specification and appended claims, the terms "for example" and "such as," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. An insulating liner for an article of clothing, comprising:
   a first layer;
   a second layer, said first and second layers each having a thickness of at least 1.5 mm;
   an insulating layer sealed between said first and second layers, wherein said insulating layer comprises an aerogel material in the form of an aerogel carried and supported by a flexible polymeric fibrous material that exhibits resiliency and bulk recovery;
   wherein, said first and second layers are impermeable to air and are hermetically sealed together about the periphery of said insulating layer.

2. An insulating liner as defined in claim 1, wherein said second layer is a composite layer having one layer formed from the same material used for said first layer and having another layer formed from a different material.

3. An insulating liner as defined in claim 1, wherein said first and second layers are structural layers that comprise PVC foam welded together about the periphery of said insulating layer.

4. An insulating liner as defined in claim 1, wherein said aerogel material comprises a polymeric, fibrous carrier material containing an aerogel in the form of a nonporous silica matrix.

5. An insulating liner as defined in claim 4, wherein said carrier material further comprises a carbon-based substrate.

6. An insulating liner as defined in claim 4, wherein said carrier material further comprises a polyester substrate.

7. An insulating liner as defined in claim 1, further comprising a thermally reflective layer supported by one of said first and second layers.

8. A shoe liner, comprising:
   a first PVC foam layer;
   a second PVC foam layer;
   a wearing material attached to an outer surface of said second layer; and
   an aerogel material hermetically sealed between said first and second layers, wherein said aerogel material comprises an aerogel carried by a flexible fibrous substrate, wherein said first and second foam layers and said flexible fibrous substrate together form a compressible structure for said shoe liner that provides cushioning in use.

9. A shoe liner as defined in claim 8, wherein said first and second layers each have a thickness in the range of 1.5 mm to 2.5 mm and are welded together about the periphery of said insulating layer.

10. A shoe liner as defined in claim 8, wherein said wearing material is formed from polyester.

11. A shoe liner as defined in claim 8, further comprising a frontal region defined by portions of said first and second layers bonded together without said insulating layer therebetween.

12. A shoe liner as defined in claim 11, wherein said frontal region includes raised contour lines identifying cut lines along which the insulating liner may be trimmed to various sizes.

13. A shoe liner as defined in claim 8, wherein said aerogel is an aerogel composite.

14. A shoe liner as defined in claim 13, wherein said aerogel composite is a nonporous silica matrix and the fibrous substrate is a polymeric, carbon-based fibrous substrate.

15. An insulating liner for an article of clothing, comprising:
   a first layer;
   a second layer;
   an insulating layer that includes:
      a fibrous carrier material in the form of a sheet cut to fit between the first and second layers; and
      an aerogel dispersed throughout the fibrous carrier material such that the aerogel is impregnated in and supported by the carrier material;
   wherein said insulating layer is sealed between said first and second layers; and
   wherein said insulating layer comprises a compressible layer that exhibits resiliency and bulk recovery;
   wherein, said first and second layers are impermeable to air and are hermetically sealed together about the periphery of said insulating layer.

16. An insulating liner as defined in claim 15, wherein said second layer is a composite layer having one layer formed from the same material used for said first layer and having another layer formed from a different material.

17. An insulating liner as defined in claim 15, wherein said first and second layers are structural layers that comprise PVC foam welded together about the periphery of said insulating layer.

18. An insulating liner as defined in claim 15, wherein said carrier material further comprises a carbon-based substrate.

19. An insulating liner as defined in claim 15, wherein said carrier material further comprises a polyester substrate.

20. An insulating liner as defined in claim 15, further comprising a wearing material attached to an outer surface of said second layer.

21. An insulating liner as defined in claim 15, further comprising a thermally reflective layer supported by one of said first and second layers.

* * * * *